(12) United States Patent
Brown (10) Patent No.: US 9,077,111 B2
(45) Date of Patent: Jul. 7, 2015

(54) PLUG RETENTION APPARATUS

(75) Inventor: Lisa S. Brown, Granite Bay, CA (US)

(73) Assignee: SynapSense Corporation, Folsom, CA (US)

( * ) Notice: Subject to any disclaimer, the term of this patent is extended or adjusted under 35 U.S.C. 154(b) by 519 days.

(21) Appl. No.: 13/566,063

(22) Filed: Aug. 3, 2012

(65) Prior Publication Data

US 2014/0037260 A1 Feb. 6, 2014

(51) Int. Cl.
| | |
|---|---|
| H01R 13/639 | (2006.01) |
| G02B 6/36 | (2006.01) |
| G02B 6/44 | (2006.01) |
| H04N 9/31 | (2006.01) |

(52) U.S. Cl.
CPC ............ *H01R 13/6392* (2013.01); *G02B 6/368* (2013.01); *G02B 6/4452* (2013.01); *G02B 6/4439* (2013.01); *G02B 6/3616* (2013.01); *G02B 6/3624* (2013.01); *H04N 9/3161* (2013.01)

(58) Field of Classification Search
CPC ............ H01R 13/6392; G02B 6/3624; G02B 6/3998; G02B 6/3893; G02B 6/3616; G02B 6/4439; G02B 6/42; G02B 6/368; G02B 6/4452; H04N 9/3161
See application file for complete search history.

(56) References Cited

U.S. PATENT DOCUMENTS

| | | | |
|---|---|---|---|
| 1,665,095 A | 4/1928 | Henry | |
| 1,844,916 A | 2/1932 | Dykes | |
| 1,899,360 A | 2/1933 | Roudebush et al. | |
| 1,988,171 A | 1/1935 | Frank et al. | |
| 1,989,823 A | 2/1935 | Raabe | |
| 2,406,567 A | 8/1946 | Schueneman | |
| 2,461,427 A | 2/1949 | Kneebone | |
| 2,487,801 A | 11/1949 | Healy, Jr. | |
| 2,720,633 A | 10/1955 | Westberg | |
| 2,721,313 A | 10/1955 | English | |
| 2,725,543 A | 11/1955 | Tanner | |
| 2,753,536 A | 7/1956 | Tjader | |
| 2,761,109 A | 8/1956 | Hacker | |
| 2,841,635 A | 7/1958 | Witzell et al. | |
| 2,903,669 A | 9/1959 | Gilman et al. | |
| 2,976,374 A | 3/1961 | Poulsen | |
| 2,994,734 A | 8/1961 | Scofield et al. | |
| 3,005,176 A | 10/1961 | Berg | |
| 3,014,194 A | 12/1961 | Berglund | |
| 3,030,601 A | 4/1962 | Krebs | |
| 3,048,810 A | 8/1962 | Steen | |
| 3,059,209 A | 10/1962 | Bird | |
| 3,141,723 A | 7/1964 | Bonhomme | |
| 3,183,470 A | 5/1965 | Hale | |
| 3,187,090 A | 6/1965 | Edwards | |
| 3,223,958 A | 12/1965 | Prohl | |
| 3,344,393 A | 9/1967 | Hendee | |
| 3,383,639 A | 5/1968 | Anderson et al. | |

(Continued)

*Primary Examiner* — Akm Enayet Ullah (74) *Attorney, Agent, or Firm* — Inventive Patent Law P.C.; Jim H. Salter (57) ABSTRACT

Various embodiments are disclosed for a plug retention apparatus, which includes: a male retention portion including a first flexible clasp for applying a retaining force to a plug assembly inserted therein, the male retention portion further including a ratchet member configured with a toothed bar: and a female retention portion including a second flexible clasp for applying a retaining force to the plug assembly inserted therein, the female retention portion further including an opening to receive the ratchet member of the male retention portion, the female retention portion further including a pawl configured to engage the toothed bar of the ratchet member.

16 Claims, 6 Drawing Sheets

(56) References Cited

U.S. PATENT DOCUMENTS

| | | |
|---|---|---|
| 3,428,936 A | 2/1969 | Arnao, Jr. |
| 3,475,716 A | 10/1969 | Laig |
| 3,484,736 A | 12/1969 | Wyse |
| 3,609,638 A | 9/1971 | Darrey |
| 3,613,046 A | 10/1971 | Kirk |
| 3,781,761 A | 12/1973 | Harwood |
| 3,960,432 A | 6/1976 | Wilbur |
| 3,999,828 A | 12/1976 | Howell |
| 4,097,105 A | 6/1978 | Zumwalt |
| 4,143,934 A | 3/1979 | Siebert |
| 4,145,105 A | 3/1979 | Dobson |
| 4,183,603 A | 1/1980 | Donarummo |
| 4,184,732 A | 1/1980 | Hudson |
| 4,204,738 A | 5/1980 | Tillotson |
| 4,221,449 A | 9/1980 | Shugart, Jr. |
| D264,045 S | 4/1982 | Elliot et al. |
| 4,424,407 A | 1/1984 | Barbie |
| 4,514,026 A | 4/1985 | Herbert |
| 4,596,430 A | 6/1986 | Olson |
| 4,643,505 A | 2/1987 | House et al. |
| 4,664,463 A | 5/1987 | Carmo |
| 4,690,476 A | 9/1987 | Morgenrath |
| 4,702,540 A | 10/1987 | Siemon |
| 4,773,874 A | 9/1988 | Kopeski, Jr. |
| 4,832,618 A | 5/1989 | Gunderson |
| 4,854,015 A | 8/1989 | Shaull |
| 4,869,683 A | 9/1989 | Nelson |
| 4,884,979 A | 12/1989 | Budner |
| 4,886,228 A | 12/1989 | Kennedy |
| 4,907,984 A | 3/1990 | Keller |
| 4,917,626 A | 4/1990 | Barton |
| 4,957,450 A | 9/1990 | Pioszak |
| D317,298 S | 6/1991 | Schmidt et al. |
| D319,382 S | 8/1991 | Hunter |
| 5,075,933 A | 12/1991 | Kemper |
| 5,075,934 A | 12/1991 | Osedo |
| 5,104,335 A | 4/1992 | Conley et al. |
| 5,129,839 A | 7/1992 | VanSkiver |
| 5,133,671 A | 7/1992 | Boghosian |
| 5,167,524 A | 12/1992 | Falcon et al. |
| D340,695 S | 10/1993 | Merriman et al. |
| 5,273,454 A | 12/1993 | Shotey |
| 5,336,107 A | 8/1994 | Sheryll |
| D353,578 S | 12/1994 | Johnson et al. |
| 5,443,397 A | 8/1995 | Carl |
| D368,649 S | 4/1996 | Smartnick |
| D374,815 S | 10/1996 | Snow |
| 5,584,720 A | 12/1996 | Elswick |
| 5,603,628 A * | 2/1997 | Schapiro, Jr. ............ 439/327 |
| 5,732,445 A | 3/1998 | Stodolka et al. |
| 5,733,138 A | 3/1998 | Kramer |
| 5,745,958 A | 5/1998 | Kaldor |
| 5,752,848 A | 5/1998 | Youngmark |
| 5,782,649 A | 7/1998 | Aiken |
| 5,876,234 A | 3/1999 | Hester |
| D415,110 S | 10/1999 | Maguire |
| D416,784 S | 11/1999 | Singer |
| 5,996,962 A * | 12/1999 | Chang et al. ............ 248/694 |
| 6,135,803 A | 10/2000 | Kovacik et al. |
| 6,196,859 B1 | 3/2001 | Garlarza |
| 6,217,366 B1 | 4/2001 | Weisstock |
| D456,361 S | 4/2002 | Troxell |
| 6,375,231 B1 | 4/2002 | Picha et al. |
| 6,478,601 B2 | 11/2002 | Oswald |
| D474,156 S | 5/2003 | Vournou |
| D495,999 S | 9/2004 | Lewis |
| 7,123,716 B2 | 10/2006 | Jozitis et al. |
| 7,186,130 B1 | 3/2007 | Miller |
| 7,303,418 B2 | 12/2007 | O'Connor |
| 7,407,405 B1 | 8/2008 | Slenczka |
| 7,442,067 B1 | 10/2008 | Amaral |
| 7,465,182 B1 | 12/2008 | McDonald |
| 7,887,360 B2 | 2/2011 | Andrade |
| 7,972,165 B1 | 7/2011 | Lifson |
| 2003/0139085 A1 | 7/2003 | Lin |
| 2003/0157824 A1 | 8/2003 | Ito |
| 2004/0097120 A1 | 5/2004 | Limber et al. |
| 2004/0166718 A1 | 8/2004 | Yoest |
| 2008/0153336 A1* | 6/2008 | McEwan et al. ............ 439/327 |
| 2009/0064465 A1 | 3/2009 | Andrade |

\* cited by examiner

PLUG RETENTION APPARATUS

TECHNICAL FIELD

The disclosed subject matter relates to the field of electrical or optical cords and connectors, and more particularly to a plug retention apparatus.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the disclosure as provided below and in the drawings that form a part of this document: Copyright 2011-2012 SynapSense Corporation, All Rights Reserved.

BACKGROUND

Electrical or optical devices, such as computing equipment, often possess a cord having a plug to be engaged with a receiving socket, such as that found on a cord from a power source or data source. The cords of these devices are subject to snagging and may be easily disengaged, interrupting the electrical connection and posing a potential safety hazard if the plug becomes partially disengaged thereby exposing the contacts.

To address this issue, various solutions have been proposed for securing or locking mechanisms or retaining structures that fit over the connected plugs or sockets to prevent disengagement of the plugs. Unfortunately, typical retaining structures are not adaptable to fit different sizes of electrical plugs. In most cases, the retaining structure is not adjustable. Hence, the cord that is to be attached and secured with this device must be sized to the securing device, which limits the use of the securing device to just a single cord.

A further difficulty with plug securing devices is that the portion that actually attaches to the electrical cord can become dislodged as a result of force exerted on the cord. It will be appreciated that in many different circumstances, the forces exerted on the cords can be quite large as people or equipment are pulling or otherwise flexing the cords. Hence, there is a continuing need to be able ensure that the plug retention apparatus is less likely to become dislodged from the cord or plug.

BRIEF DESCRIPTION OF THE DRAWINGS

The various embodiments are illustrated by way of example, and not by way of limitation, in the figures of the accompanying drawings in which.

DETAILED DESCRIPTION

In the following detailed description, a reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is provided a plug retention apparatus. A particular embodiment relates to an electrical plug retention apparatus that provides a connection retention mechanism for two plugs when the two plugs are connected to one another. The plug retention apparatus is fabricated from two components, which include a male retention portion and a female retention portion. The male retention portion is designed to be attached to a first side of a plug assembly. The female retention portion is designed to be attached to a second side of a plug assembly. When the first and second sides of the plug assembly are removably attached to one another, the male retention portion and the female retention portion of the plug retention apparatus are designed to be removably attached to one another, thereby preventing the first and second sides of the plug assembly from being disconnected from one another, unless that is the actual intent.

Figure 1:
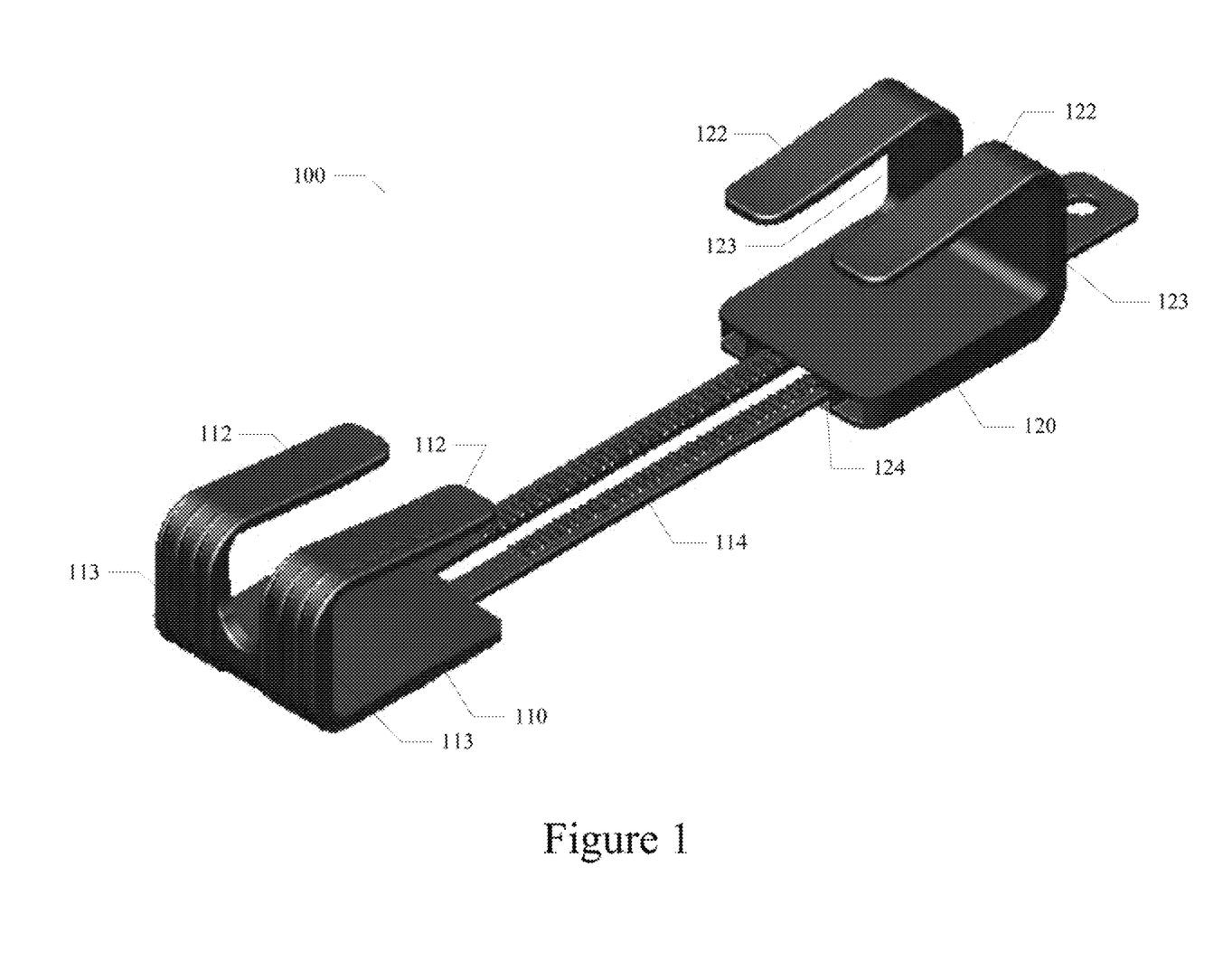
FIG. 1 illustrates a perspective top view of an example embodiment of a plug retention apparatus.
Figure 6:
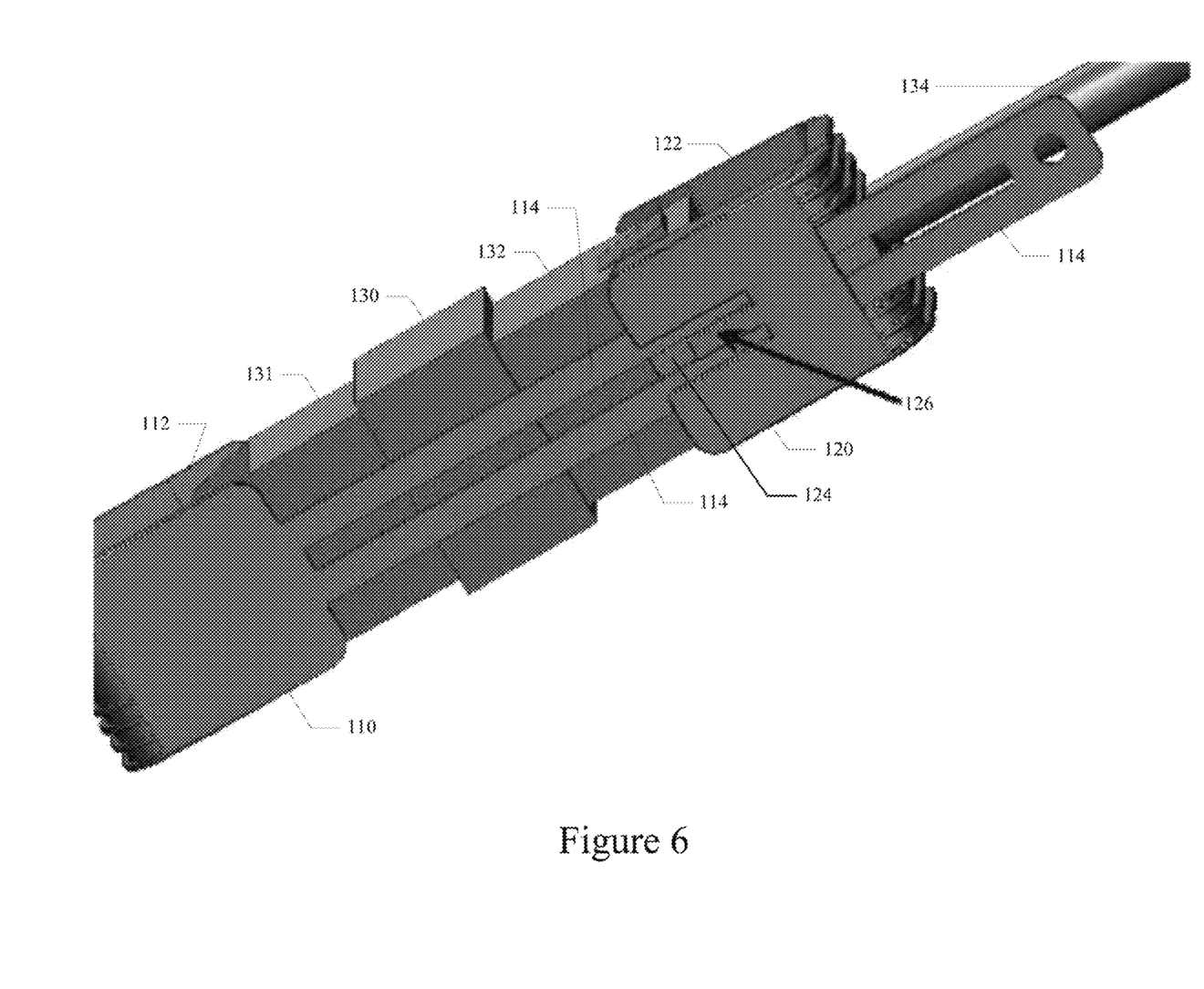
FIG. 6 illustrates a perspective bottom view of an example embodiment of the plug retention apparatus with a plug assembly inserted therein.

Referring now to FIG. 1, the diagram illustrates a perspective top view of an example embodiment of a plug retention apparatus 100. The plug retention apparatus 100 includes a male retention portion 110 and a female retention portion 120. The male retention portion 110 includes two (dual) flexible clasps 112 used to apply a retaining force to a plug assembly (not shown) positioned between the male retention portion 110 and the female retention portion 120. The female retention portion 120 also includes two (dual) flexible clasps 122 used to apply a retaining force to a plug assembly (not shown) positioned between the male retention portion 110 and the female retention portion 120. The dual flexible clasps 112 and 122 include U-shaped portions 113 and 123, which include a surface to apply a mechanical force to the plug assembly captured between the male retention portion 110 and the female retention portion 120. The surface of the U-shaped portions 113 and 123 is typically perpendicular to a direction in which the two ends of the plug assembly are connected. In most cases, the plug assembly includes strain relief portions on both ends where the cords or cables attach to the two ends of the plug assembly. The surface of the U-shaped portions 113 and 123 can apply a mechanical force to the strain relief portions of the plug assembly thereby preventing the two ends of the plug assembly from disengaging. By applying the mechanical force to the strain relief portions of the plug assembly, the various embodiments can accommodate a wider range of differently sized plug assemblies. As described in more detail below, the dual flexible clasps 112 include a gap therebetween to provide space for a cord or cable attached to the plug assembly. The dual flexible clasps 112 can be flexibly deflected upward to accommodate larger plug assemblies. The male retention portion 110 also includes a ratchet member 114 configured to slide into an opening 124 of the female retention portion 120 and engage a pawl contained therein. In an example embodiment, the ratchet member 114 is configured as two (dual) toothed bars permanently attached as part of the male retention portion 110 and removably connectable with the female retention portion 120 via the opening 124 and the pawl contained within the female retention portion 120. The dual toothed bars of ratchet member 114 provide a greater retention force for holding the plug assembly together than can be provided by a single toothed bar. In one embodiment, the ratchet member 114 of the male retention portion 110 can be completely removed from the opening 124 of the female retention portion 120 to completely separate the male retention portion 110 from the female retention portion 120. In another embodiment, the ratchet member 114 of the male retention portion 110 cannot be completely removed from the opening 124 of the female retention portion 120 after the ratchet member 114 is initially inserted into the opening 124. In this embodiment, the male retention portion 110 and the female retention portion 120 are configured such that once the male retention portion 110 is inserted into the female retention portion 120, the male retention portion 110 and the female retention portion 120 will never fully come apart. This embodiment provides for ease of installation and prevents the loss of separated parts. In either embodiment, the male retention portion 110 and the female retention portion 120 can be manufactured as two separate components that once connected cannot be separated, but only slide as far as the ratchet member 114 allows in length.

Referring still to FIG. 1, the female retention portion 120 also includes two (dual) flexible clasps 122 used to apply a retaining force to a plug assembly (not shown) positioned between the male retention portion 110 and the female retention portion 120. As described above, the dual flexible clasps 122 include a U-shaped portion 123, which includes a surface to apply a mechanical force to the plug assembly captured between the male retention portion 110 and the female retention portion 120. As described in more detail below, the dual flexible clasps 122 include a gap therebetween to provide space for a cord or cable attached to the plug assembly. The dual flexible clasps 122 can be flexibly deflected upward to accommodate larger plug assemblies. As described above, the female retention portion 120 also includes an opening 124 for receiving the ratchet member 114 of male retention portion 110. As described in more detail in connection with FIG. 6, the female retention portion 120 includes a pawl for engaging and removably holding the ratchet member 114 in place once the ratchet member 114 is inserted into opening 124.

Figure 2:
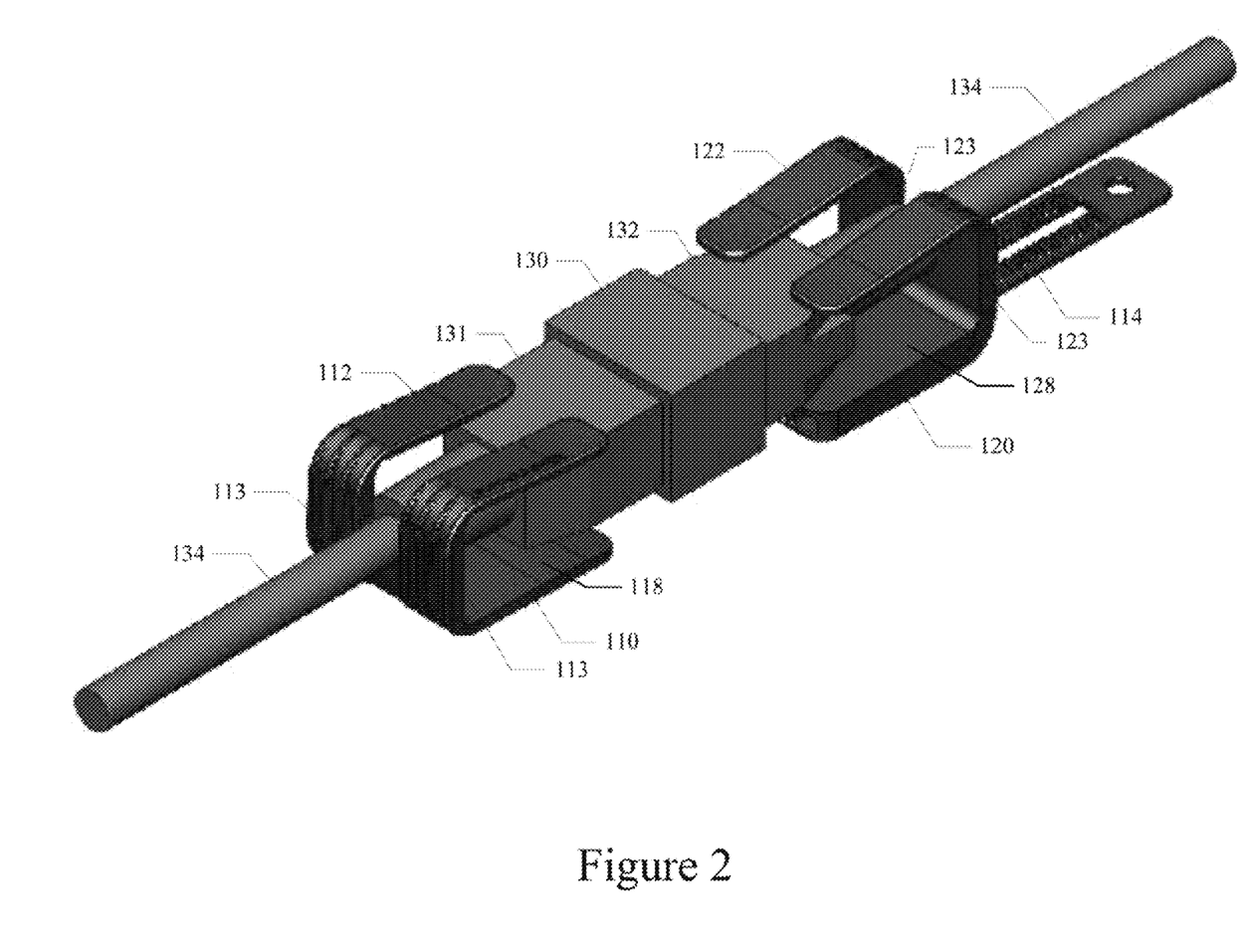
FIG. 2 illustrates a perspective top view of an example embodiment of the plug retention apparatus with a plug assembly inserted therein.

Referring now to FIG. 2, the diagram illustrates a perspective top view of an example embodiment of the plug retention apparatus 100 with a plug assembly 130 inserted therein. The plug assembly 130 can represent any conventional form of coupling mechanism for joining two ends 134 of a cord or cable. For example, the plug assembly 130 can include standard electrical plugs having a first (male) side 131 and second (female) side 132 and being removably attachable to one another to form a continuous electrical connection between the two ends 134 of the cord or cable. For another example, the plug assembly 130 can include standard data connectors having a first (male) side 131 and second (female) side 132 and being removably attachable to one another to form a continuous data connection between the two ends 134 of the cord or cable. For another example, the plug assembly 130 can include standard optical connectors having a first side 131 and second side 132 and being removably attachable to one another to form a continuous optical connection between the two ends 134 of the cord or cable. As described above, the plug assembly 130 can include strain relief portions on both ends where the cords or cables attach to the two ends of the plug assembly 130. It will be apparent to those of ordinary skill in the art that the plug assembly 130 can include a wide variety of different kinds of standard connectors. As also apparent to those of ordinary skill in the art, the plug assembly 130 can be configured in a variety of different sizes and shapes. As such, it is important that the plug retention apparatus 100 also be configured to accommodate the variety of different sizes and shapes of the plug assembly 130. This aspect of the plug retention apparatus 100 is described in more detail below.

Referring still to FIG. 2. the diagram illustrates the plug retention apparatus 100 with a plug assembly 130 inserted therein. As shown, the cord or cable ends 134 of the plug assembly 130 can fit in a gap provided on each of the dual flexible clasps 112 and 122. On a first side 131 of the plug assembly 130, the dual flexible clasps 112 are configured to capture the plug assembly 130 between a lower surface 118 of male retention portion 110 and the dual flexible clasps 112. On a second side 132 of the plug assembly 130, the dual flexible clasps 122 are configured to capture the plug assembly 130 between a lower surface 128 of female retention portion 120 and the dual flexible clasps 122. Meanwhile, the ratchet member 114 of male retention portion 110 can be inserted into the opening 124 (shown in FIG. 1) of female retention portion 120. The male retention portion 110 can be pushed toward the female retention portion 120 until the plug assembly 130 prevents further movement. As the male retention portion 110 and the female retention portion 120 are pushed together, the teeth of ratchet member 114 slide over the pawl of the female retention portion 120. Because of the engagement of the pawl with the teeth of ratchet member 114, the male retention portion 110 and the female retention portion 120 can be pushed together, but not pulled apart. Thus, as the male retention portion 110 and the female retention portion 120 are pushed together, the plug retention apparatus 100 is locked on to the plug assembly 130 thereby preventing the first and second sides (131 and 132, respectively) of the plug assembly 130 from being disconnected from one another, unless the pawl is released as described in more detail below.

Figure 3:
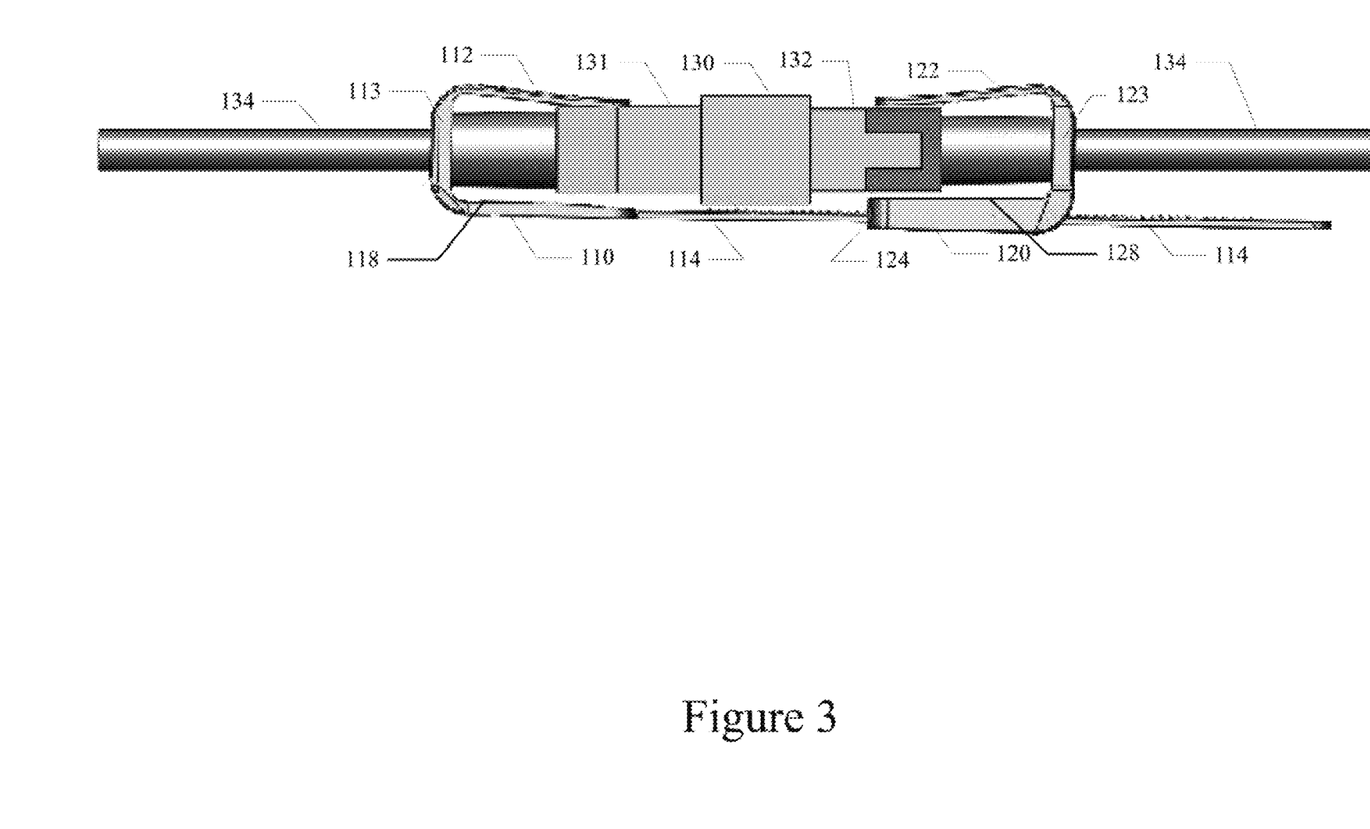
FIG. 3 illustrates a side view of an example embodiment of the plug retention apparatus with a plug assembly inserted therein.

Referring now to FIG. 3, the diagram illustrates a side view of an example embodiment of the plug retention apparatus 100 with a plug assembly 130 inserted therein. As shown, a first side 131 of the plug assembly 130 is captured between a lower surface 118 of male retention portion 110 and the dual flexible clasps 112. On a second side 132 of the plug assembly 130, the dual flexible clasps 122 are configured to capture the plug assembly 130 between a lower surface 128 of female retention portion 120 and the dual flexible clasps 122. Meanwhile, the ratchet member 114 of male retention portion 110 can be inserted into the opening 124 of female retention portion 120. The male retention portion 110 can be pushed toward the female retention portion 120 until the plug assembly 130 prevents further movement. As the male retention portion 110 and the female retention portion 120 are pushed together, the teeth of ratchet member 114 slide over the pawl of the female retention portion 120. Because of the engagement of the pawl with the teeth of ratchet member 114, the male retention portion 110 and the female retention portion 120 can be pushed together, but not pulled apart. Thus, as the male retention portion 110 and the female retention portion 120 are pushed together, the plug retention apparatus 100 is locked on to the plug assembly 130 thereby preventing the first and second sides (131 and 132, respectively) of the plug assembly from being disconnected from one another, unless the pawl is released as described in more detail below.

Figure 4:
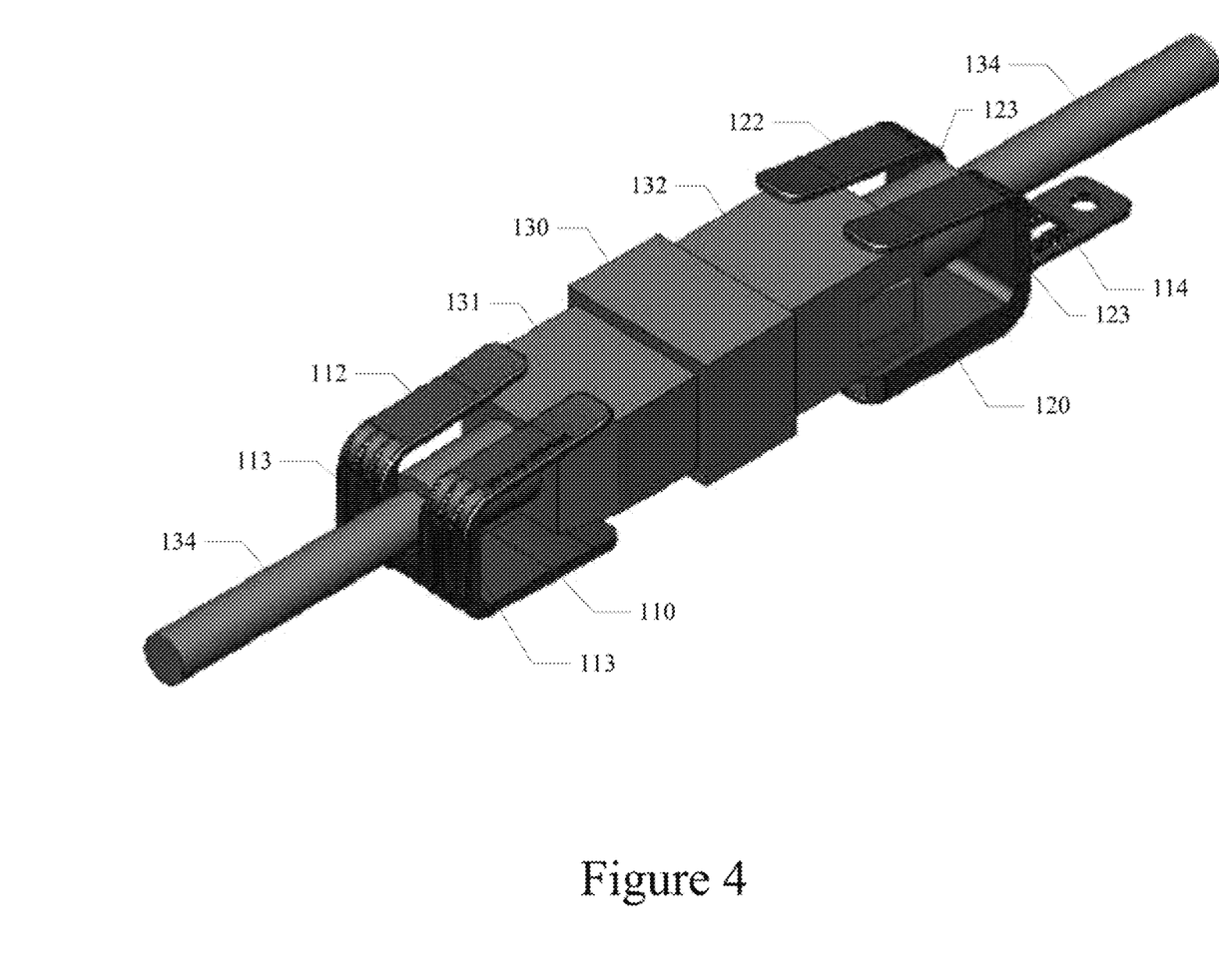
FIG. 4 illustrates a perspective top view of another example embodiment of the plug retention apparatus with a plug assembly inserted therein.
Figure 5:
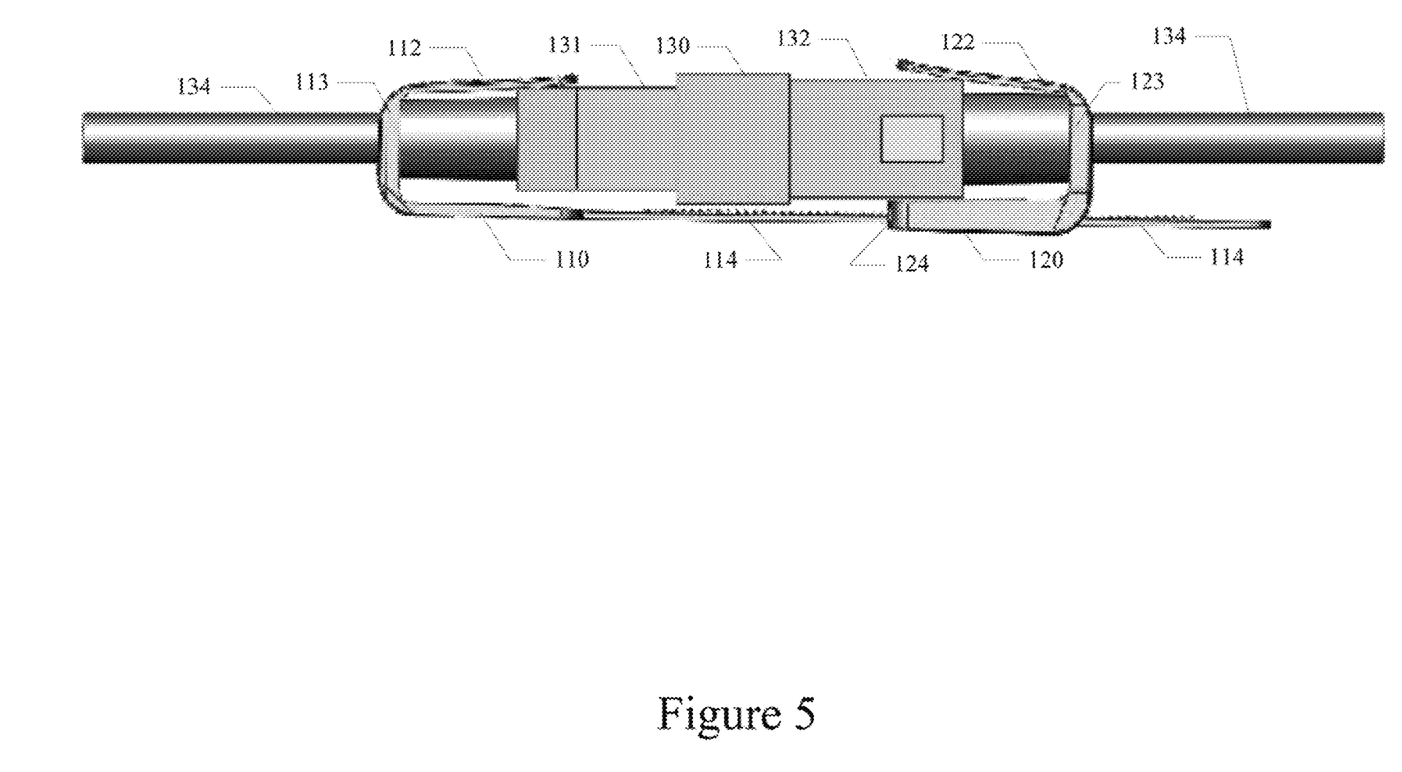
FIG. 5 illustrates a side view of another example embodiment of the plug retention apparatus with a plug assembly inserted therein.

Referring now to FIGS. 4 and 5, the diagrams illustrate a perspective top view and a side view of another example embodiment of the plug retention apparatus 100 with a plug assembly 130 inserted therein. In the example shown, the plug assembly 130 is larger than the plug assembly 130 shown in FIGS. 2 and 3. When used in a variety of applications, the plug assembly 130 used with the plug retention apparatus 100 can be configured in a variety of different sizes and shapes. As such, it is important that the plug retention apparatus 100 be configured to accommodate the variety of different sizes and shapes of the plug assembly 130. In an example embodiment, the dual flexible clasps 112 of male retention portion 110 and the dual flexible clasps 122 of female retention portion 120 can be flexibly deflected upward to accommodate larger plug assemblies. This upward deflection of dual flexible clasps 112 and 122 is shown in FIGS. 4 and 5. Given the flexible nature of the dual flexible clasps 112 and 122, the plug retention apparatus 100 can accommodate a wide variety of different sizes and shapes of the plug assembly 130. This aspect of the various embodiments makes the plug retention apparatus 100 highly versatile.

Referring now to FIG. 6, the diagram illustrates a perspective bottom view of an example embodiment of the plug retention apparatus 100 with a plug assembly 130 inserted therein. FIG. 6 illustrates the release mechanism of an example embodiment. As shown, the ratchet member 114 of male retention portion 110 has been inserted into the opening 124 of female retention portion 120. The male retention portion 110 can be pushed toward the female retention portion 120 until the plug assembly 130 prevents further movement. As the male retention portion 110 and the female retention portion 120 are pushed together, the teeth of ratchet member 114 slide over the pawl 126 of the female retention portion 120. Because of the engagement of the pawl 126 with the teeth of ratchet member 114, the male retention portion 110 and the female retention portion 120 can be pushed together, but not pulled apart. Thus, as the male retention portion 110 and the female retention portion 120 are pushed together, the plug retention apparatus 100 is locked on to the plug assembly 130 thereby preventing the first and second sides (131 and 132, respectively) of the plug assembly 130 from being disconnected from one another, unless the pawl 126 is released. The pawl 126 can be released by pressing an underside of the pawl 126 as shown by the arrow in FIG. 6 while the male retention portion 110 and the female retention portion 120 are pulled apart. The action of pressing an underside of the pawl 126 serves activate the release mechanism and to disengage the pawl 126 from the teeth of ratchet member 114 and enable the male retention portion 110 and the female retention portion 120 to be pulled apart and separated thus enabling removal of the plug retention apparatus 100 from the plug assembly 130. It will be apparent to those of ordinary skill in the art that the pawl 126 can be configured in a variety of different ways and still engage the teeth of ratchet member 114 to lock the plug retention apparatus 100 around the plug assembly, thereby preventing the first and second sides (131 and 132, respectively) of the plug assembly 130 from being disconnected from one another, unless the pawl 126 is released.

The plug retention apparatus 100 of various embodiments can be fabricated from various forms of nylon or plastics, including polyethylene or a similar plastic blend material. In one embodiment, a nylon material denoted as CP Pryme N200HSL Black can be used. Alternatively, another type of plastic or polyvinyl chloride (PVC) material can be used; however, PVC can become brittle at low temperatures and thus unsuitable in some environments. Alternative embodiments can be fabricated from other rigid materials, such as aluminum, stainless steel, fiberglass, ceramic, composite materials, or wood. Ideally, the best materials are strong, but flexible to a point. Alternative embodiments of plug retention apparatus 100 can also be fabricated in different shapes, such as oval, triangular, rectangular, or polygonal.

Applications that may include the apparatus and systems of various embodiments broadly include a variety of electronic and computer systems, electrical devices, data communication devices, optical devices, and a variety of other devices that use some form of cabling or cords that include pluggable connections. As disclosed herein, the various embodiments of the plug retention apparatus 100 provide an easily engaged, positively engaged, removable, re-useable, versatile, effective, and strong mechanism for safely and securely locking together first and second sides of a plug assembly, which are removably attached to one another. The various embodiments disclosed herein can support a load of 15 pounds of force or less applied axially (pulling apart) to the male retention portion 110 and the female retention portion 120 without premature release or failure of the locking mechanism. The various embodiments disclosed herein can also support a plugged distance range of 3.5 to 5.5 inches.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to he construed as limiting. The elements, materials, geometries, dimensions. and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, as described above, a plug retention apparatus is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A plug retention apparatus comprising:
   a male retention portion including a first flexible clasp for applying a retaining force to a plug assembly inserted therein, the male retention portion further including a ratchet member configured with a toothed bar; and
   a female retention portion including a second flexible clasp for applying a retaining force to the plug assembly inserted therein, the female retention portion further including an opening to receive the ratchet member of the male retention portion, the female retention portion further including a pawl configured to engage the toothed bar of the ratchet member.

2. The apparatus as claimed in claim 1 wherein the first flexible clasp and the second flexible clasp are configured to flexibly deflected upward to accommodate larger plug assemblies.

3. The apparatus as claimed in claim 1 wherein the first flexible clasp and the second flexible clasp are each configured to include two (dual) flexible clasps.

4. The apparatus as claimed in claim 1 wherein the first flexible clasp and the second flexible clasp are each configured to include gaps to provide space for a cord or cable attached to the plug assembly.

5. The apparatus as claimed in claim 1 wherein the ratchet member is configured as two (dual) toothed bars permanently attached as part of the male retention portion.

6. The apparatus as claimed in claim 1 wherein the female retention portion further includes a release mechanism for causing the pawl to disengage from the toothed bar of the ratchet member.

7. The apparatus as claimed in claim 6 wherein the release mechanism can be activated by pressing an underside of the pawl.

8. The apparatus as claimed in claim 1 wherein the plug retention apparatus is fabricated from a form of plastic.

9. An apparatus comprising:
   a male retention means including a first flexible clasp means for applying a retaining force to a plug assembly inserted therein, the male retention means further including a ratchet means configured with a toothed bar; and
   a female retention means including a second flexible clasp means for applying a retaining force to the plug assembly inserted therein, the female retention means further including an opening to receive the ratchet means of the male retention means, the female retention means further including a pawl means configured to engage the toothed bar of the ratchet means.

10. The apparatus as claimed in claim 9 wherein the first flexible clasp means and the second flexible clasp means are configured to flexibly deflected upward to accommodate larger plug assemblies.

11. The apparatus as claimed in claim 9 wherein the first flexible clasp means and the second flexible clasp means are each configured to include two (dual) flexible clasp means.

12. The apparatus as claimed in claim 9 wherein the first flexible clasp means and the second flexible clasp means are each configured to include gaps to provide space for a cord or cable attached to the plug assembly.

13. The apparatus as claimed in claim 9 wherein the ratchet means is configured as two (dual) toothed bars permanently attached as part of the male retention means.

14. The apparatus as claimed in claim 9 wherein the female retention means further includes a release means for causing the pawl means to disengage from the toothed bar of the ratchet means.

15. The apparatus as claimed in claim 14 wherein the release means can be activated by pressing an underside of the pawl means.

16. The apparatus as claimed in claim 9 wherein the apparatus is fabricated from a form of plastic.

* * * * *